(12) United States Patent
Nakamura et al.

(10) Patent No.: US 6,542,305 B2
(45) Date of Patent: Apr. 1, 2003

(54) OPENING COVER UNIT FOR HEAD-UP DISPLAY IN VEHICLE

(75) Inventors: Go Nakamura, Shizuoka (JP); Kunimitsu Aoki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/132,324

(22) Filed: Apr. 26, 2002

(65) Prior Publication Data

US 2002/0166273 A1 Nov. 14, 2002

(30) Foreign Application Priority Data

May 11, 2001 (JP) .................................... 2001-142130

(51) Int. Cl.[7] ............................................. G02B 27/14
(52) U.S. Cl. ........................................ 359/630; 359/631
(58) Field of Search ............................ 359/630, 631, 359/632, 633; 296/70; 345/7

(56) References Cited

U.S. PATENT DOCUMENTS

| | | | |
|---|---|---|---|
| 5,212,471 A | * | 5/1993 | McDonald .................. 340/705 |
| 5,677,701 A | * | 10/1997 | Okuyama et al. ............. 345/7 |
| 6,359,737 B1 | * | 3/2002 | Stringfellow ............... 359/631 |
| 2002/0012173 A1 | * | 1/2002 | Aoki et al. ................. 359/630 |
| 2002/0118462 A1 | * | 8/2002 | Nill ........................ 359/632 |
| 2002/0167189 A1 | * | 11/2002 | Nakamura et al. ............ 296/70 |

* cited by examiner

Primary Examiner—Ricky Mack
(74) Attorney, Agent, or Firm—Armstrong, Westerman & Hattori, LLP

(57) ABSTRACT

The cover unit for a head-up display disposed in a vehicle opens and closes an opening which passes beams of an image emitted from a displaying device toward a screen. The displaying device is disposed in the dashboard, and the image is superposed on a foreground of the vehicle to be visible from a driver's eye. The screen is located outside the dashboard. The cover unit has an intercepting plate for interrupting a view line directed from the eye toward the inside of the dashboard in a standing state of the intercepting plate. The intercepting plate is movable between the standing state and a lying state. The cover unit further has a cover body movable between a closed state and an open state of the opening. The cover body is hinged to the intercepting plate so that the cover body is folded up with the intercepting plate at the open state and the cover body is extended together with the intercepting plate in the closed state. The cover body has an upper surface treated to prevent reflection of an external beam in the open state as well as in the closed state.

15 Claims, 14 Drawing Sheets

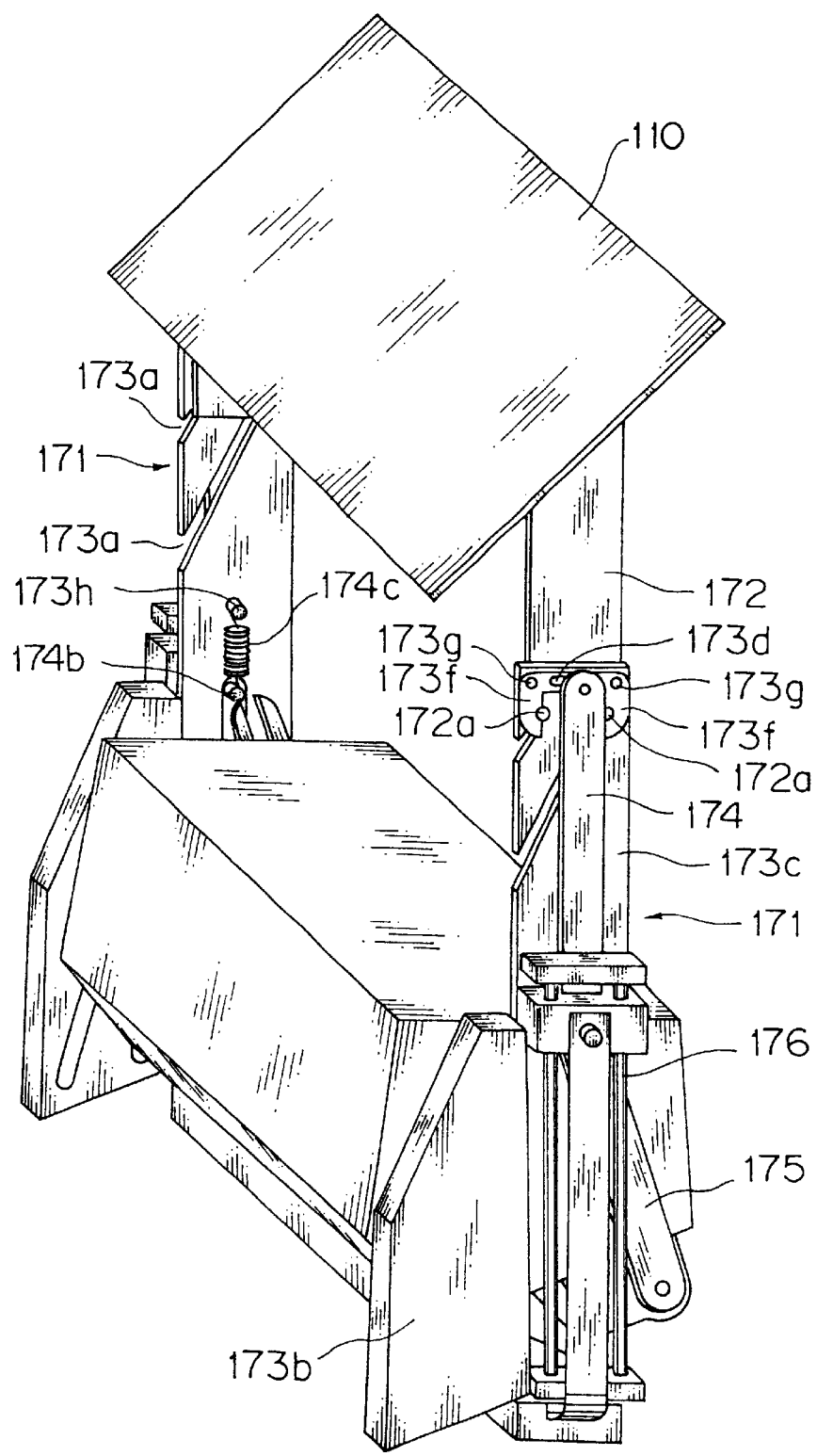
F I G. 1 7

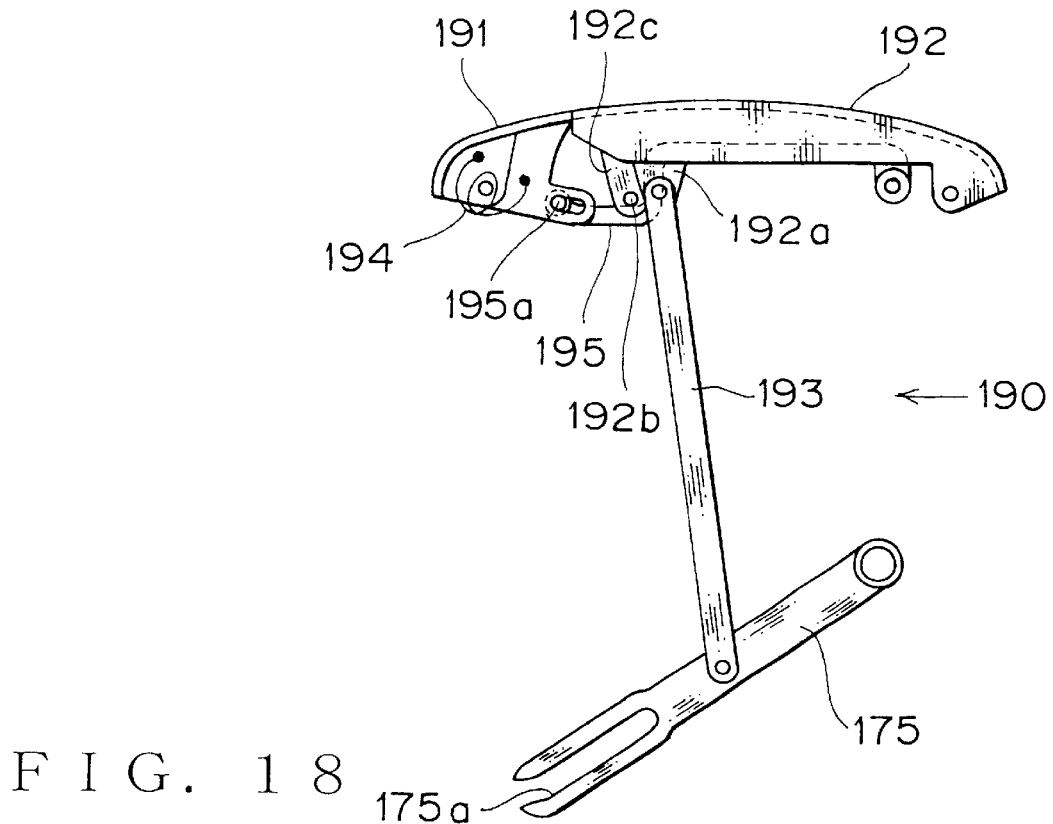
F I G. 1 8
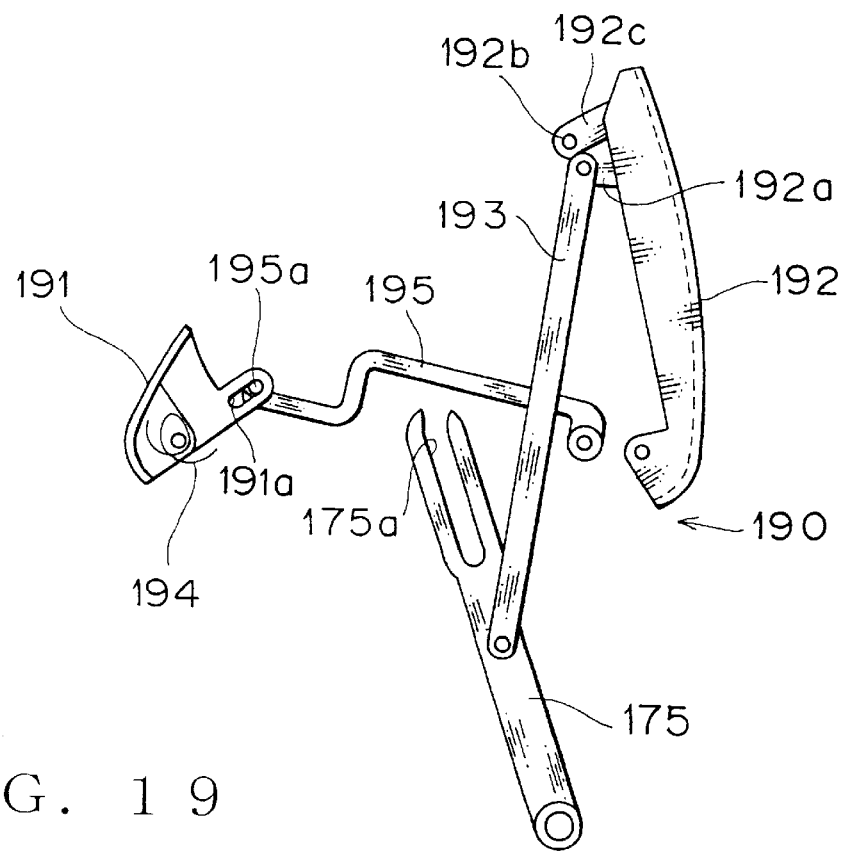
F I G. 1 9

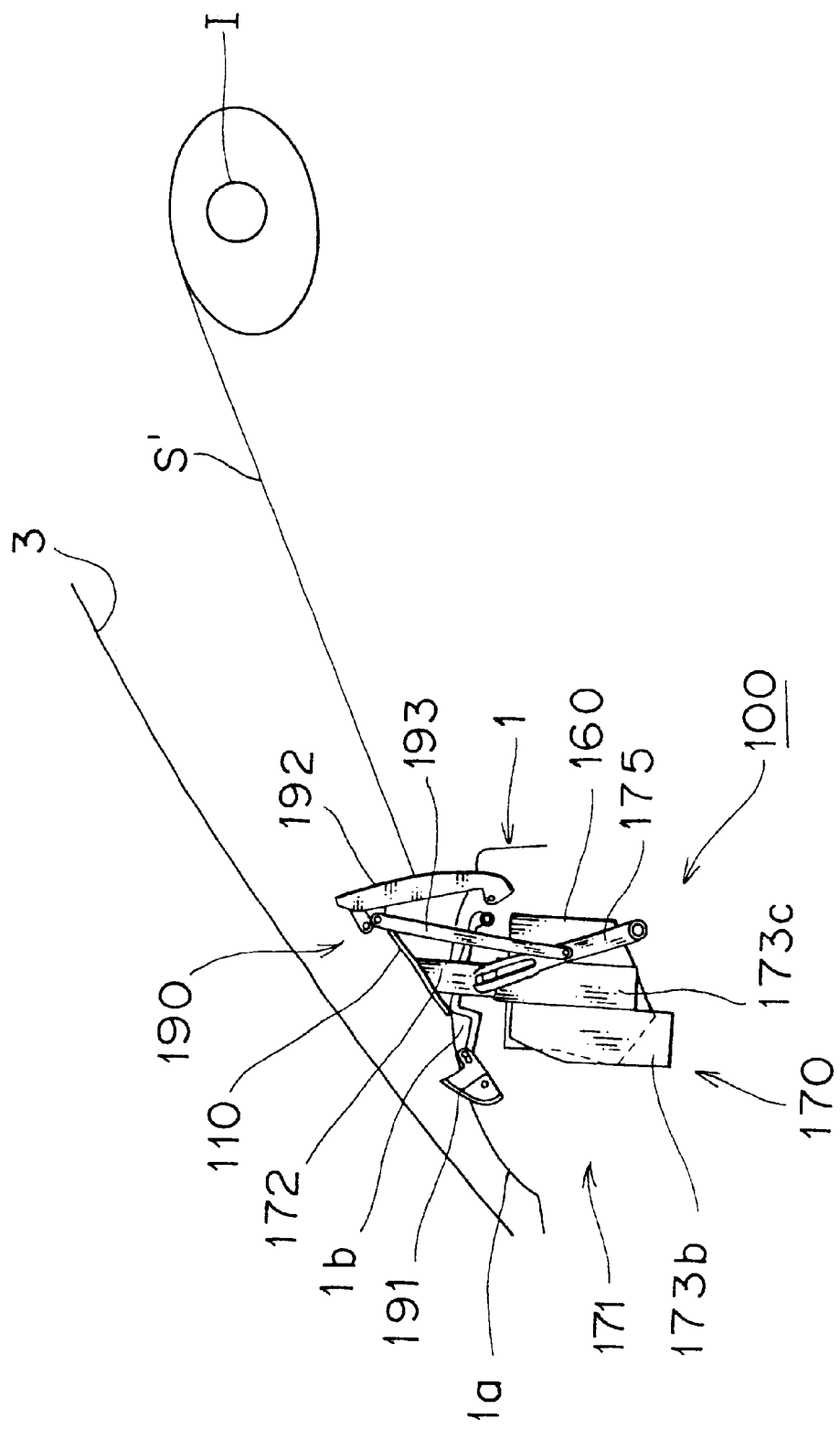
F I G. 2 1

OPENING COVER UNIT FOR HEAD-UP DISPLAY IN VEHICLE

BACKGROUND OF THE INVENTION

1. Field of the Invention

The present invention relates to a head-up display to project an image of optical information emitted from a displaying device on a windshield or a combining screen for superposing the image with a foreground seen through the windshield so as to be visible from a driver's eye. The display is disposed in a dashboard of a vehicle, and the combining screen is positioned above the dashboard.

2. Related Art

A head-up display used in a vehicle provides optional information required for operating the vehicle such that the information is superposed on a foreground visible through a windshield of the vehicle. A driver who is looking forward to operate the vehicle can see the optional information with a less view line movement.

The vehicle has a dashboard formed with an opening for passing an image emitted from a displaying device toward the windshield or a combining screen located above the dashboard.

Through the opening, a view line of the driver's eye may possibly enter directly the dashboard since the driver's eye is positioned above the opening.

The direct sight of the inside of the dashboard causes an annoyance for the driver when the displaying device is projecting the image, since undesired beams are emitted from the opening. Therefore, it is necessary that a view line of the driver's eye does not enter directly the dashboard through the opening.

SUMMARY OF THE INVENTION

In view of the aforementioned situation, an object of the invention is to provide a cover unit for a head-up display to prevent undesired beams emitted through an opening of a dashboard of a vehicle. The head-up display projects an image of optical information emitted from a displaying device on a windshield or a combining screen through the opening for superposing the image on a foreground seen through the windshield to be visible from a driver's eye. The display is disposed in the dashboard, and the combining screen is positioned above the dashboard.

For achieving the object, a first aspect of the invention is a cover unit for a head-up display disposed in a vehicle to open and close an opening of a dashboard which passes beams of an image emitted from a displaying device toward a screen. The displaying device is disposed in the dashboard. The image is superposed on a foreground of the vehicle so as to be visible from a driver's eye. The screen is located outside the dashboard. The cover unit has an intercepting plate movable between a standing position and a lying position. The intercepting plate is standing on a rear periphery of the opening for interrupting a view line directed from the eye toward the inside of the dashboard at the standing position, while the intercepting plate does not interrupt a view line directed from the eye toward the foreground at the lying position. The cover unit further has a cover body movable to close and open the opening between a closed state and an open state of the opening. The intercepting plate is standing in the open state and is lying in the closed state of the opening.

Thus, the intercepting plate interrupts a view line directed toward the inside of the dashboard from the eye in the standing state of the intercepting plate, since the intercepting plate is standing on the periphery of the opening in the standing state. That is, the view line of the eye can not directly enter the dashboard through the opening.

This eliminates an annoyance that a view line of the driver's eye directly enters the dashboard through the opening during the operation of the vehicle.

Preferably, each of the intercepting plate and the cover body has a surface treated to limit reflection of an external beam when the surface faces toward the opening in the open state of the opening.

Thus, external beams, which are reflected toward the windshield by the intercepting plate and the cover body, will be minimized, so that the external beams will not reach the eye by way of the windshield in the open state of the cover body.

Preferably, the cover body has at least one closure member that serves as the intercepting plate. Thereby, no intercepting plate is required in addition to the closure member, simplifying the cover unit in construction.

Preferably, the cover unit further includes a transparent protection cover laid over the opening, the transparent protection cover being overlaid by the cover body in the closed state of the opening. The intercepting plate is configured to interrupt an external beam reflected on the transparent protection cover exposed outward at the standing position of the intercepting plate at least to prevent the external beam from entering the eye.

Preferably, the cover body is hinged to the intercepting plate such that the cover body is folded up with the intercepting plate in the open state, the cover body being extended together with the intercepting plate in the closed state. The cover body has an upper surface treated to prevent reflection of an external beam in the open state as well as in the closed state, the upper surface facing generally in a forward direction of the vehicle in the open state.

Thus, the intercepting plate prevents reflection of an external beam in its standing state, even when the external beam is reflected by the transparent protection cover. Accordingly, the external beam, which is reflected toward the windshield by the intercepting plate, will be minimized, so that the external beam will not reach the eye by way of the windshield in the open state of the cover body.

The upper surface of the cover body may be surface-treated in the same way of a general surface of the dashboard for irregular light reflection, unifying the surfaces in appearance.

Preferably, the upper surface of the cover body has an imprint to provide a surface roughness as well as a surface of the dashboard which is flush with the upper surface of the cover body in the closed state.

Thus, external beams, which are reflected toward the windshield by the cover body, will be minimized, so that the external beams will not reach the eye by way of the windshield.

Preferably, the screen is a combining screen disposed outside the dashboard at an operational position of the combining screen, and the combining screen is received in the dashboard at a non-operational position of the combining screen. The opening and closing movements of the intercepting plate and the cover body are in an interlocking relationship with the movement of the combining screen between the operational position and the non-operational position.

Thus, when the combining screen is moved outside the dashboard, the intercepting plate and the cover body stand up to open the opening. In the meantime, when the combining screen is moved inside the dashboard, the intercepting plate and the cover body are laid to close the opening.

Accordingly, no additional operation is required for starting the opening and closing movements of the intercepting plate and the cover body.

Preferably, the opening and closing movements of the intercepting plate and the cover body are in an interlocking relationship with ON-OFF operations for displaying the image in the displaying device.

That is, the ON operation for displaying the image in the displaying device raises the intercepting plate and the cover body to open the opening. In the meantime, the OFF operation not to display the image in the displaying device moves the intercepting plate and the cover body to close the opening.

Accordingly, no additional operation is required for starting the opening and closing movements of the intercepting plate and the cover body.

A second aspect of the present invention is a cover unit for a head-up display disposed in a vehicle to open and close an opening which passes beams of an image emitted from a displaying device toward a screen. The displaying device is disposed in the dashboard, and the image is superposed on a foreground of the vehicle to be visible from a driver's eye, the screen located outside the dashboard. The cover unit includes a fore cover and a rear cover for cooperatively closing the opening. The rear cover interrupts a view line directed from the eye toward the inside of the dashboard at an open position of the rear cover where the rear cover is standing on a rear periphery of the opening. Preferably, the screen is a combining screen disposed outside the dashboard at an operational position of the combining screen, the combining screen being received in the dashboard through the opening at a non-operational position of the combining screen, and the rear cover is operatively connected to a strut of the combining screen via a swing lever and a link arm so that the opening and closing movements of the cover plates are in an interlocking relationship with the movement of the combining screen between the operational position and the non-operational position. Preferably, the fore cover is urged toward the open state by a spring. Preferably, the cover unit further includes a swing limiting arm operatively connected to the fore cover for limiting the fore cover in movable range, and the rear cover pushes the swing limiting arm when the rear cover moves to close the opening so that the swing limiting arm can move the fore cover to close the opening together with the rear cover.

BRIEF DESCRIPTION OF THE DRAWINGS

FIG. 17 is a perspective view showing an operation state of the link unit of FIG. 9, which includes the combining screen;

FIG. 18 is a partially sectional, side view showing a cover unit of FIG. 8, the cover unit being in its closed state;

FIG. 19 is a partially sectional, side view showing the cover unit of FIG. 8, the cover unit being in its open state;

FIG. 21 is a side view illustrating an operational state of the head-up display of the second embodiment, the combining screen being at its intermediate position.

DETAILED DESCRIPTION OF PREFERRED EMBODIMENTS

Referring to the accompanied drawings, embodiments of an opening cover unit of a head-up display according to the present invention will be discussed.

Figure 1:
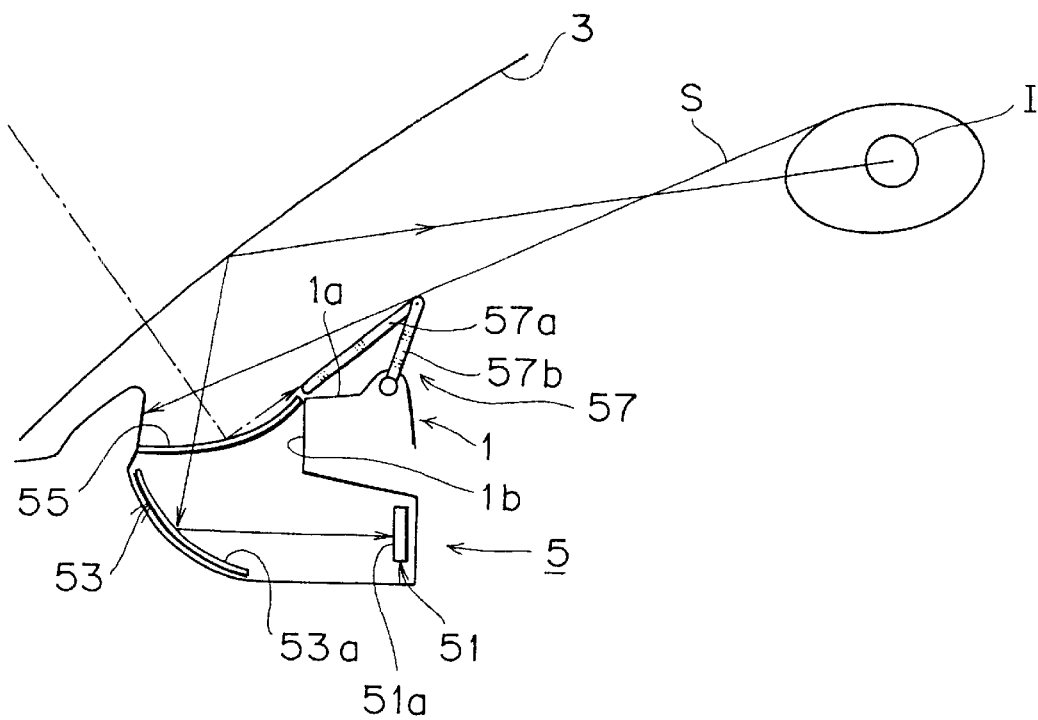
FIG. 1 is a sectional view illustrating an operational state of a head-up display of a first embodiment employing an opening cover unit according to the present invention, an intercepting plate being at its standing position.

FIG. 1 is a side view illustrating an operational state of a head-up display employing an opening cover unit of a first embodiment according to the present invention. Reference numeral 5 designates the head-up display of the first embodiment. The head-up display superposes an image projected on a windshield 3 (corresponding to a screen described in the summary of the invention) with a foreground visible through the windshield 3. The windshield 3, which is above an upper surface 1a of a dashboard 1 of a vehicle, has a substantially uniform inclination angle relative to a vertical or longitudinal direction of the vehicle.

The head-up display 5 further has a displaying device 51 for displaying an image projected on the windshield 3, a magnifying reflector 53, a transparent protection cover 55, a cover unit 57, etc. The dashboard 1 accommodates the displaying device 51 and the magnifying reflector 53.

The magnifying reflector 53 has a concave reflection surface 53a and is positioned just under a generally rectangular opening 1b formed in the upper surface 1a of the dashboard 1 within the dashboard 1 such that the reflection surface 53a orients rearward in a diagonally upward direction of the vehicle.

The displaying device 51 consists of a luminescence device (e.g., a field emission display), an electron-ray indicator tube, an electro-luminescence display, or a liquid crystal display with a back light. The displaying device 51 has a display surface 51a opposed to the reflection surface 53a of the magnifying reflector 53 for displaying optional information required for the operation of the vehicle such as a running speed and a running direction of the vehicle which are obtained in use of a car navigation system.

The transparent protection cover 55 is made from a generally arc-shaped, transparent resin plate and engages with a generally rectangular peripheral frame 1c positioned a little inside the opening 1b of the dashboard 1 such that a convex surface of the transparent protection cover 55 faces the inside of the dashboard 1.

The head-up display 5 of the first embodiment displays an image on the display surface 51a of the displaying device 51. The image is enlarged and reflected by the reflection surface 53a of the magnifying reflector 53 toward the opening 1b, so that the image passes through the transparent protection cover 55 to be projected on the windshield 3 positioned above the dashboard 1 by way of the opening 1b. The windshield 3 reflects the image toward an eye of a driver of the vehicle.

Figure 2:
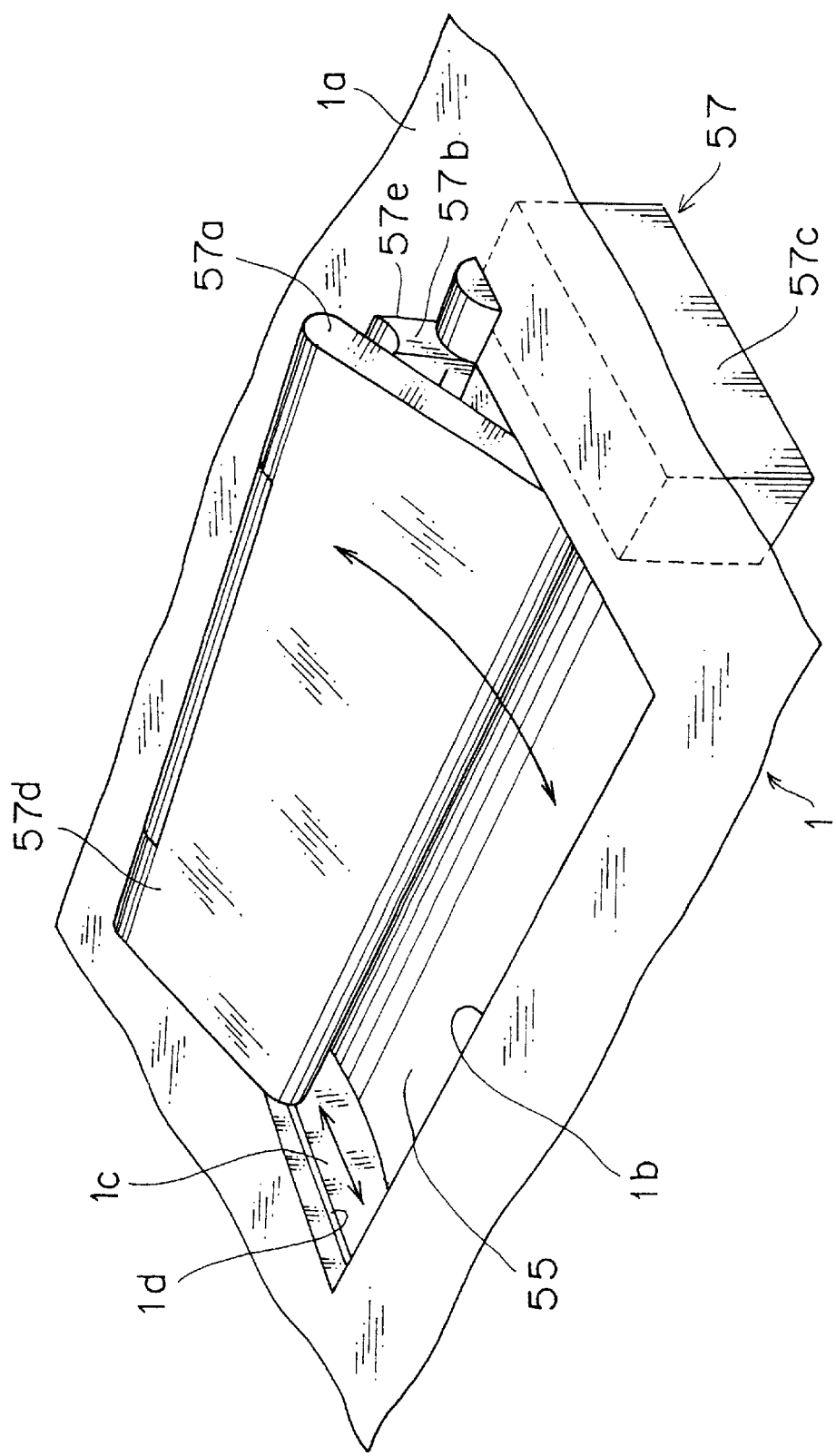
FIG. 2 is an enlarged perspective view showing the cover unit of FIG. 1.

The cover unit 57 has a cover plate 57a for closing the opening 1b, an intercepting plate 57b connected by a hinge to fold up the cover plate 57a with the intercepting plate 57b, and a motor box 57c accommodating a motor and gears (both are not shown) to move the intercepting plate 57b as illustrated in an enlarged perspective view of FIG. 2.

The intercepting plate 57b is a generally rectangular plate made of an opaque material as well as the dashboard 1. As illustrated in FIG. 1, the intercepting plate 57b has one end which is pivotably supported on a peripheral portion located slightly rearward from the opening 1b of the upper surface 1a of the dashboard 1.

Figure 3:
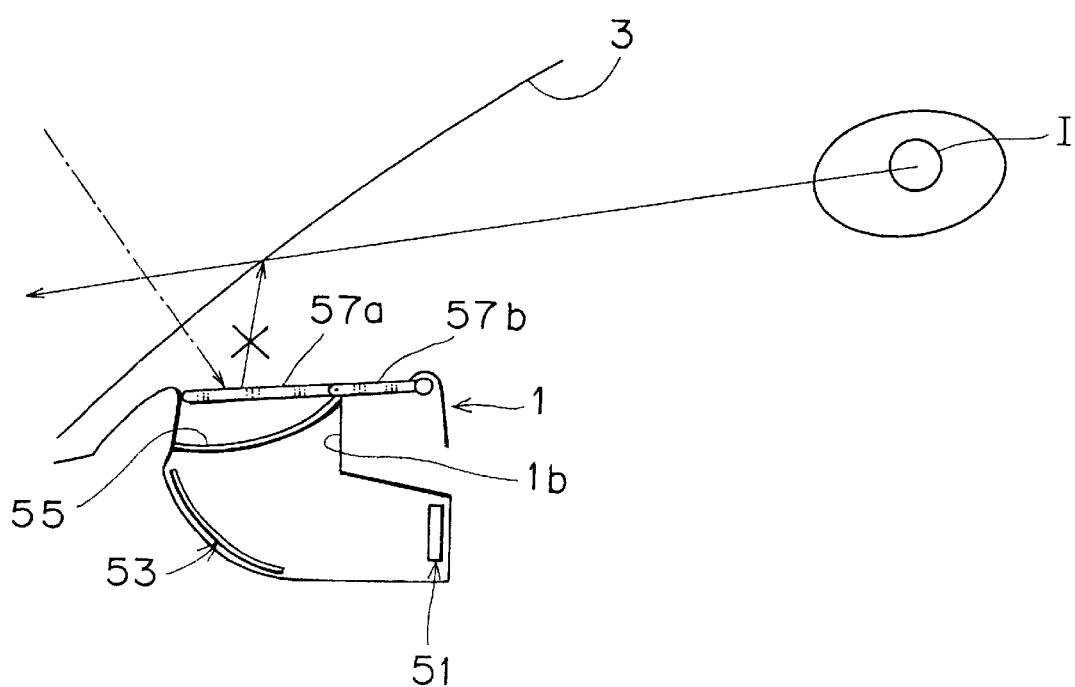
FIG. 3 is a sectional view illustrating an operational state of the head-up display of the first embodiment, the intercepting plate being at its lying position.

As illustrated in FIG. 1, the intercepting plate 57b can stand up from the upper surface 1a of the dashboard 1 to interrupt a view line S directed toward the inside of the dashboard 1 through the opening 1b from the eye I. As shown in an illustrative general side view of FIG. 3, the intercepting plate 57b can be laid along the upper surface 1a of the dashboard 1. The intercepting plate 57b is moved by an actuating force generated in the motor box 57c between the standing position and the lying position thereof.

The cover plate 57a is a generally rectangular plate made of an opaque material as well as the dashboard 1 and has a size corresponding to the opening 1b. The cover plate 57a has one end which is pivotably connected to a forward end of the intercepting plate 57b and has a guide pin (not shown) projected from each side surface near a free end of the cover plate 57a.

As illustrated in FIG. 2, each guide pin is slidably received in a guide groove id formed in each inner side surface of the opening frame 1c extended in a longitudinal direction of the vehicle. Thereby, the cover plate 57a moves between the open state shown in FIG. 1 to open the opening 1b and the closed state shown in FIG. 3 to close the opening 1b in response to the standing and lying movements of the intercepting plate 57b actuated by the force generated in the motor box 57c.

A surface 57d of the cover plate 57a and a surface 57e of the intercepting plate 57b each have a surface roughness for light reflection prevention and for a better appearance as well as the upper surface 1a of the dashboard 1. The surface 57d of the cover plate 57a and the surface 57e of the intercepting plate 57b can be substantially flush with the upper surface 1a of the dashboard 1. Note that the surface 57d of the cover plate 57a faces generally forward in the open state thereof.

As illustrated in FIG. 2, the motor box 57c is secured on a lateral outer surface of the opening frame 1c and accommodates the motor (not shown) and a series of the gears (not shown) for transmitting the actuating force of the motor to a pivot shaft (not shown) of the intercepting plate 57b. The pivot shaft is turnably supported on the upper surface 1a of the dashboard 1 at each end of the shaft.

Next, an operation of the head-up display 5, particularly of the cover unit 57 of thus configured first embodiment will be discussed.

For superposing an image generated from the display surface 51a of the displaying device 51 on a foreground seen from the eye I through the windshield 3, the motor in the motor box 57c is rotated by a predetermined number of turns. The actuating force of the motor is transmitted by the series of gears to pivot the intercepting plate 57b from the lying position to the standing position.

The standing-up motion of the intercepting plate 57b moves upward the rear end of the cover plate 57a which is hinged to the fore end of the intercepting plate 57b, while the forward end of the cover plate 57a moves in a rearward direction of the vehicle along the guide grooves 1d, since each of the guide pins is slidably received in each of the guide grooves 1d which are formed in inner side surfaces of the opening frame 1c. Thereby, the cover plate 57a is folded toward the intercepting plate 57b to completely open the opening 1b.

Accordingly, an image displayed on the display surface 51a of the displaying device 51 is reflected by the reflection surface 53a of the magnifying reflector 53 toward the opening 1b, so that an enlarged image is projected on the windshield 3 positioned above the dashboard 1 through the transparent protection cover 55. The enlarged image is superposed on a foreground of the vehicle so as to be visible via the windshield 3 from the eye I.

In this state, a view line S oriented directly toward the inside of the dashboard 1 from the eye I through the opening 1b is interrupted by the intercepting plate 57b in the standing state. Thus, the inside of the dashboard 1 is not visible from the eye I through the opening 1b.

An external beam such as sun light, which enters the inside of the vehicle through the windshield 3, will be reflected rearward by the transparent protection cover 55. The reflected beam reaches on the surface 57d of the cover plate 57a which has been folded toward the intercepting plate 57b. The beam is irregularly reflected to be attenuated due to the irregularity of the rough surface 57d, so that the reflected beam does not reach the eye I even via a further reflection of the beam on the windshield 3.

The cover plate 57a also interrupts the external beam reflected by the transparent protection cover 55 not to directly reach the eye I.

When the superposition of the image on a foreground of the vehicle is not desired, the motor in the motor box 57c is rotated by a predetermined number of turns opposite in direction to the superposing state. The actuating force of the motor is exerted via the series of gears on the intercepting plate 57b which is moved from the standing position to the lying position.

Thereby, the rear end of the cover plate 57a moves from the lifted position to come close to the opening 1b in response to the swing of the intercepting plate 57b, while the forward end of the cover plate 57a moves in a forward direction of the vehicle along the guide grooves 1d since each of the guide pins is slidably received in each of the guide grooves 1d formed in the inner side surfaces of the opening frame 1c. Thereby, the cover plate 57a is extended from the folded state to completely close the opening 1b.

Accordingly, the intercepting plate 57b laid along the opening 1b will interrupt no view line S directed from the eye I, allowing a wider view of a foreground for the driver.

In the closed state of the opening 1b, the surface 57d of the cover plate 57a and surface 57e of the intercepting plate 57b constitute a part of the upper surface 1a of the dashboard 1, and the surface 57d of the cover plate 57a and the surface 57e of the intercepting plate 57b each may have a roughness as well as a general surface of the dashboard 1. Thus, an external beam, which enters the inside of the vehicle through the windshield 3, will be little reflected by the surface 57d and surface 57e, so that the reflected beam does not reach the eye I even via a further reflection of the beam on the windshield 3.

In the head-up display 5 of the first embodiment, an image projected from the displaying device 51 accommodated in the dashboard 1 is reflected by the magnifying reflector 53 toward the windshield 3 positioned forward of the eye. The image is emitted from the dashboard 1 through the opening 1b having the cover plate 57a to close the opening 1b. In the open state of the cover plate 57a, the cover plate 57a is standing on a rear periphery of the opening 1b to interrupt the view line S oriented from the eye I directly toward the inside of the dashboard 1 through the opening 1b. In the closed state of the cover plate 57a to close the opening 1b, the cover plate 57a is laid to be flush with the upper surface 1a so that the cover plate 57a is in no interference relationship with a view line S directed from the eye I to see a foreground.

Thus, it is surely prevented that a view line S from the eye I directly enters the inside of the dashboard 1 through the opening 1b, causing no annoyance thereof for the driver.

In the first embodiment, the surface 57d of the cover plate 57a and the surface 57e of the intercepting plate 57b each have a roughness to prevent light reflection thereon. Alternatively, the surface 57d of the cover plate 57a and the surface 57e of the intercepting plate 57b may be surface-treated by a satin finish.

Optionally, the surface 57e of the intercepting plate 57b may not be surface-treated to prevent light reflection thereon, since an external beam will not reach the surface 57e in the open state of the cover plate 57a.

Preferably, the standing and lying movements of the intercepting plate 57b start in relation to ON-OFF operations of the displaying device 51 for displaying the image. That is, the standing movement of the intercepting plate 57b starts when the displaying device 51 is turned to be ON, while the lying movement of the intercepting plate 57b starts when the displaying device 51 is turned to be OFF.

Figure 4:
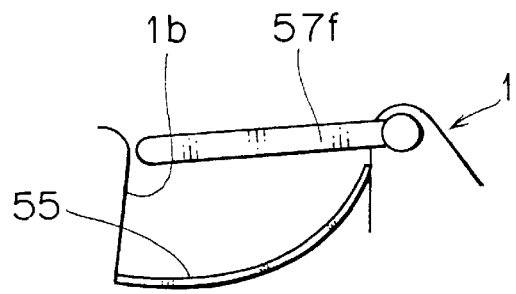
FIG. 4 is an illustrative sectional view showing an operational state of a cover unit modified from the first embodiment.
Figure 5:
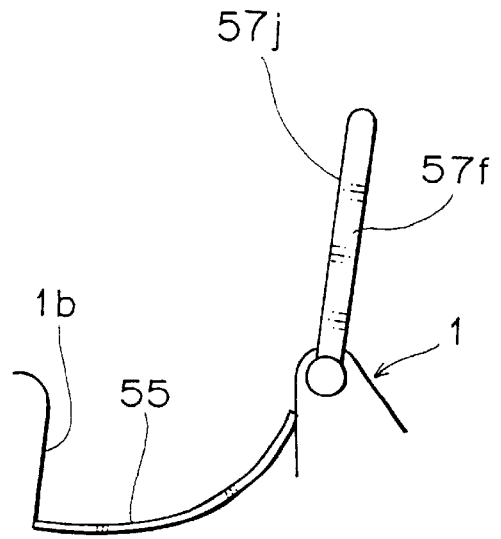
FIG. 5 is an illustrative sectional view showing another operational state of the cover unit of FIG. 4.

In the head-up display 5 of the first embodiment, the cover plate 57a opens and closes the opening 1b while the intercepting plate 57b interrupts a view line S oriented from the eye I toward the opening 1b in the standing state of the intercepting plate 57b. However, as shown in an illustrative sectional view of FIG. 4, a single cover plate 57f may be provided to close the opening 1b and to interrupt a view line S oriented from the eye I toward the opening 1b in an open state of the cover plate 57f. The cover plate 57f swings between its closed state (lying position) shown in FIG. 4 and its open state (standing position) shown in an illustrative sectional view of FIG. 5.

Figure 6:
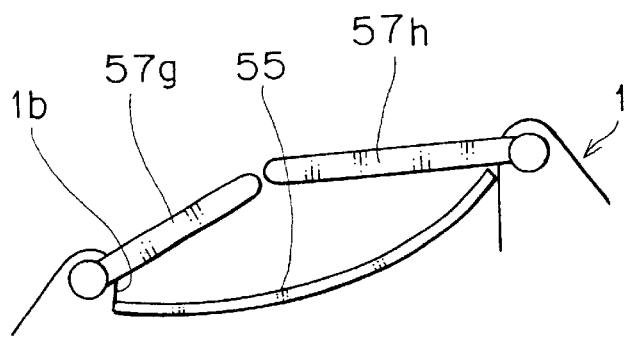
FIG. 6 is an illustrative sectional view showing an operational state of further another cover unit modified from the first embodiment.
Figure 20:
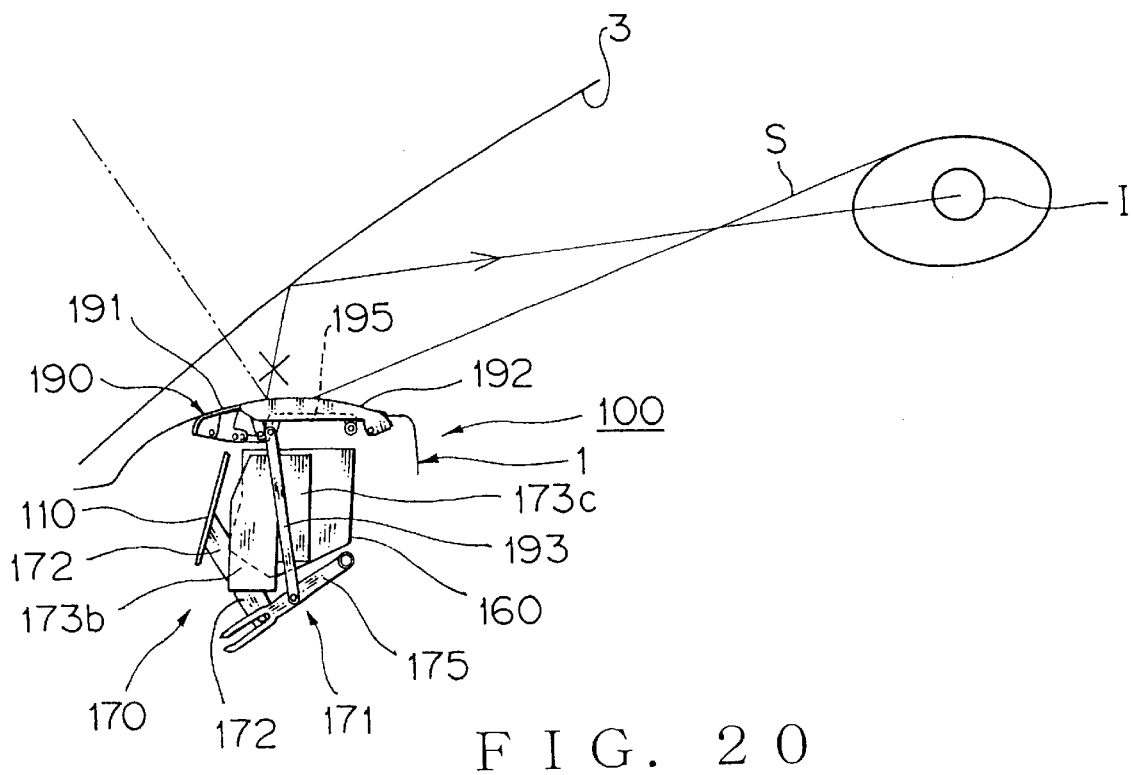
FIG. 20 is an illustrative side view showing an operation state of a head-up display of the second embodiment, the combining screen being at its stored position.
Figure 7:
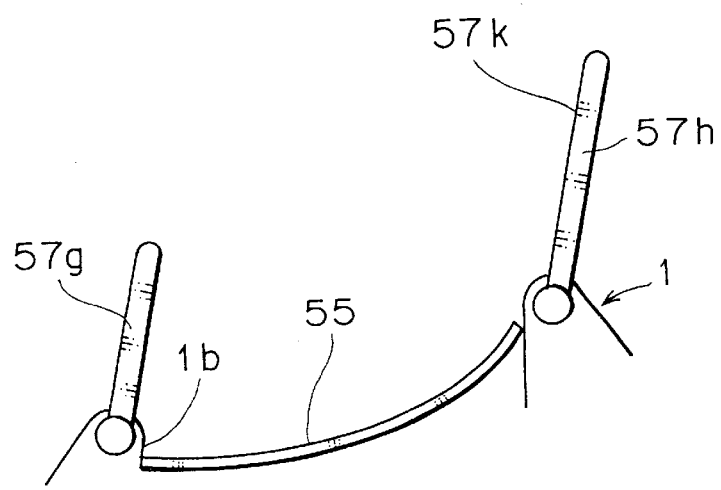
FIG. 7 is an illustrative sectional view showing another operational state of the cover unit of FIG. 6.

Alternatively, as shown in an illustrative sectional view of FIG. 6, there may be provided a pair of fore and rear cover plates 57g, 57h each pivotably supported on a fore or rear periphery of the opening 1b. The cover plates 57g and 57h swing between their closed states (lying position) shown in FIG. 6 and their open states (standing position) shown in an illustrative sectional view of FIG. 7. The rear cover plate 57h interrupts a view line S oriented from the eye I toward the opening 1b in the standing state of the cover plate 57h.

The cover plates 57f and 57h each may have a rear surface 57j or 57k treated to prevent light reflection. Thereby, an external beam, which enters the inside of the vehicle through the windshield 3, will be little reflected by the rear surface 57j or 57k, so that the reflected beam does not reach the eye I even via a further reflection of the beam on the windshield 3.

As described above, one or plural cover plates may be employed to close the opening 1b, and an additional intercepting plate may serve to interrupt a view line S oriented from the eye I toward the opening 1b in the open state of the covers.

In the head-up display 5 of the first embodiment, the transparent protection cover 55 may be replaced by an image enlarging fresnel lens while the magnifying reflector 53 may be replayed by a flat reflector. In that case, the cover plate 57a for closing the opening 1b is configured to protect an outer fresnel surface of the lens.

The present invention may be applied to a head-up display having no transparent protection cover at the opening 1b or to another head-up display having a combining screen for projecting an image emitted from a displaying device in place of a part of the windshield 3.

Next, a second embodiment of an opening cover unit according to the present-invention will be discussed with referring to accompanied drawings. A head-up display included in the second embodiment has a combining screen for projecting an image emitted from a displaying device.

Figure 8:
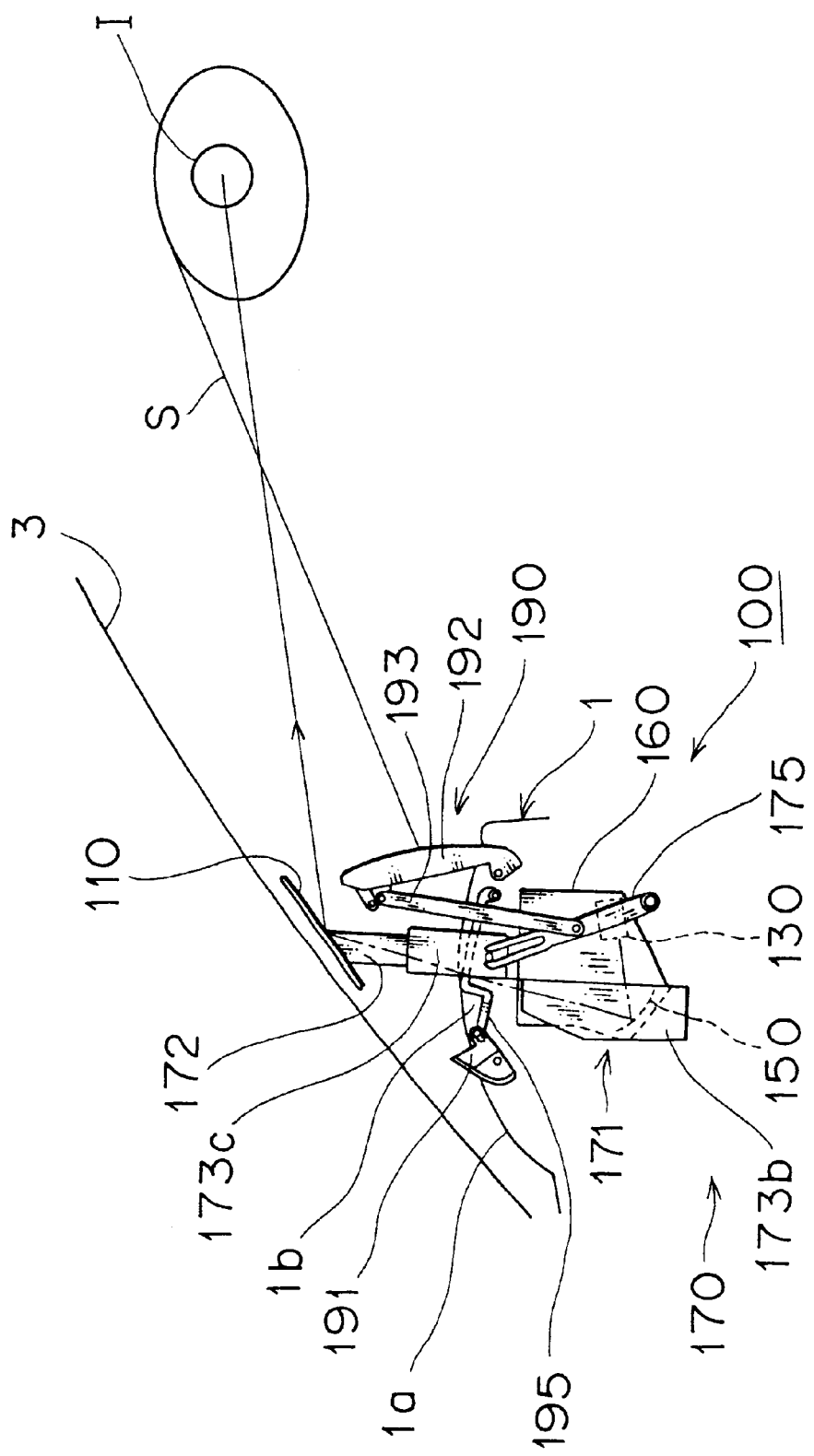
FIG. 8 is a sectional view illustrating an operational state of a head-up display employing another cover unit of a second embodiment according to the present invention, the combining screen being at its operational position.

FIG. 8 is a sectional view illustrating an operational state of the second embodiment. Reference numeral 100 designates the head-up display of the second embodiment. The head-up display superposes an image emitted toward a combining screen 110 on a foreground visible through a windshield 3 positioned forward of the combining screen 110. The combining screen 110 is located at its operational position above an opening 1b formed in an upper surface 1a of a dashboard 1 along the windshield 3 having a substantially uniform inclination angle relative to a vertical or longitudinal direction of a vehicle.

The head-up display 100 further has a displaying device 130 for displaying an image projected on the combining screen 110, a magnifying reflector 150, an elevating unit 170 for the combining screen 110, a cover unit 190, etc. The dashboard 1 accommodates the displaying device 130, the magnifying reflector 150, and the elevating unit 170.

Figure 9:
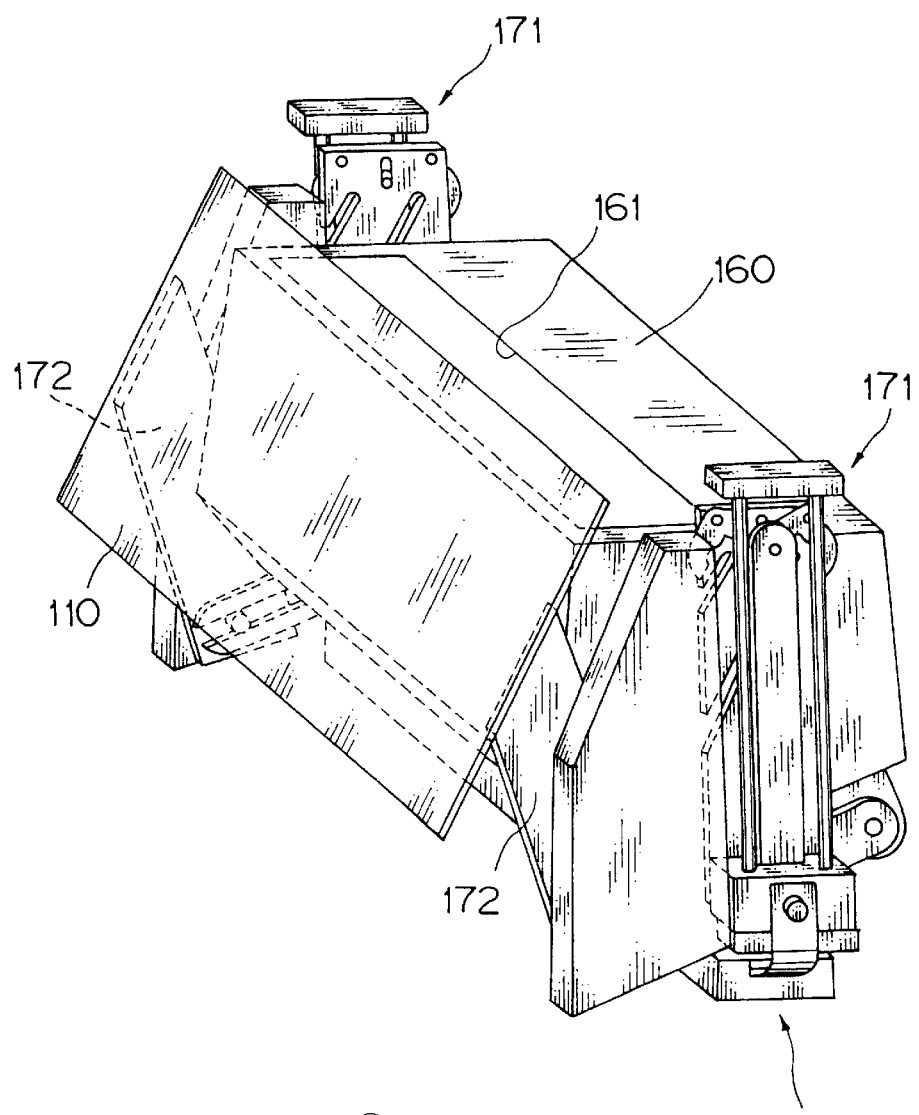
FIG. 9 is an enlarged perspective view showing a unit including a displaying device and a magnifying reflector which are shown in FIG. 8.

The displaying device 130 and the magnifying reflector 150 are defined in a unit which is received in a case 160 having an upper opening 161 for emitting an image for projecting it on the combining screen as illustrated in an enlarged perspective view of FIG. 9. The elevating unit 170 has a pair of left and right link units 171 symmetrical with each other and each positioned at each lateral side of the case 160 to be connected to the combining screen 110 for elevation of the combining screen 110.

Figure 10:
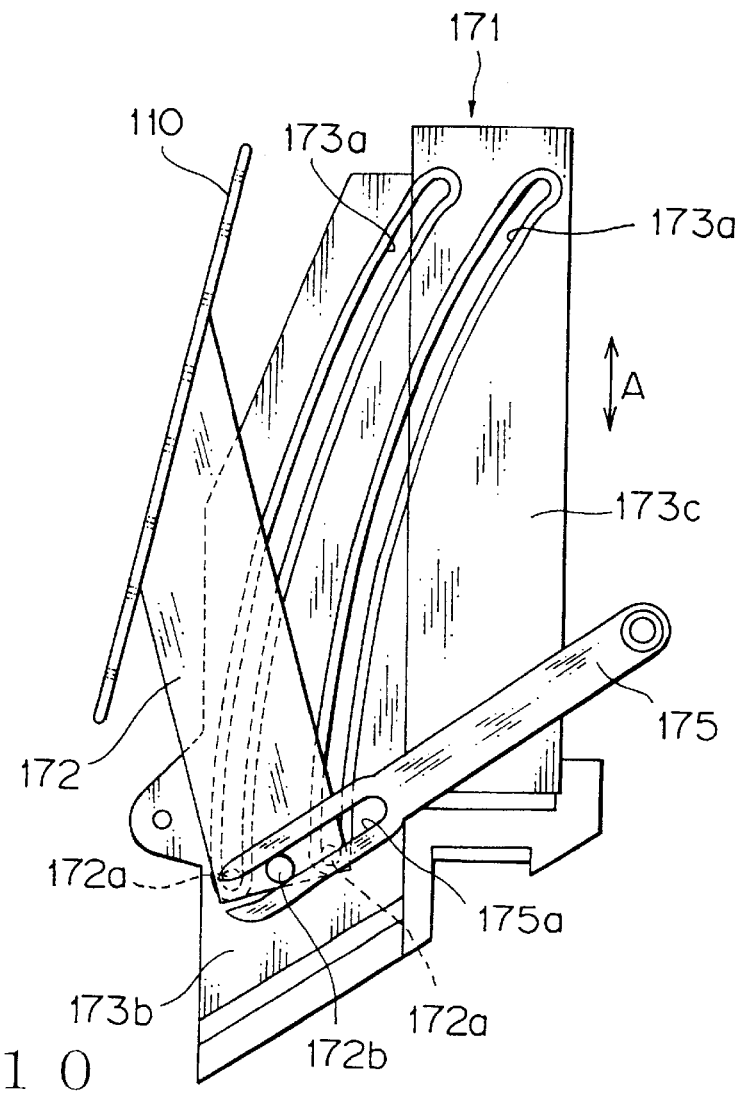
FIG. 10 is a side view showing an operation state of a link unit of FIG. 9.

Referring to each link unit 171 in more derail, the link unit 171 has a supporting strut 172 joined to one side of the combining screen 110, and the supporting strut 172 has a pair of guide pins 172a projected from its outer side surface at a lower end thereof as illustrated by imaginary lines of FIG. 10. Furthermore, the supporting strut 172 has a link pin 172b projected from its inner side surface at a lower end thereof as illustrated by a solid line of FIG. 10.

The elevating unit 170 further has a fixed base frame 173b and a movable base frame 173c, and across the fixed base frame 173b and the movable base frame 173c, there are provided a pair of arc-shaped guide cam slots 173a for guiding the pair of guide pins 172a.

An upper part of each guide cam slot 173a is formed in the movable base frame 173c so as to penetrate the movable base frame 173c, while the other lower part of the guide cam slot 173a is formed in an inner side surface of the fixed base frame 173b.

The movable base frame 173c moves relative to the fixed base frame 173b in a direction shown by a double head arrow A in FIG. 10.

Figure 11:
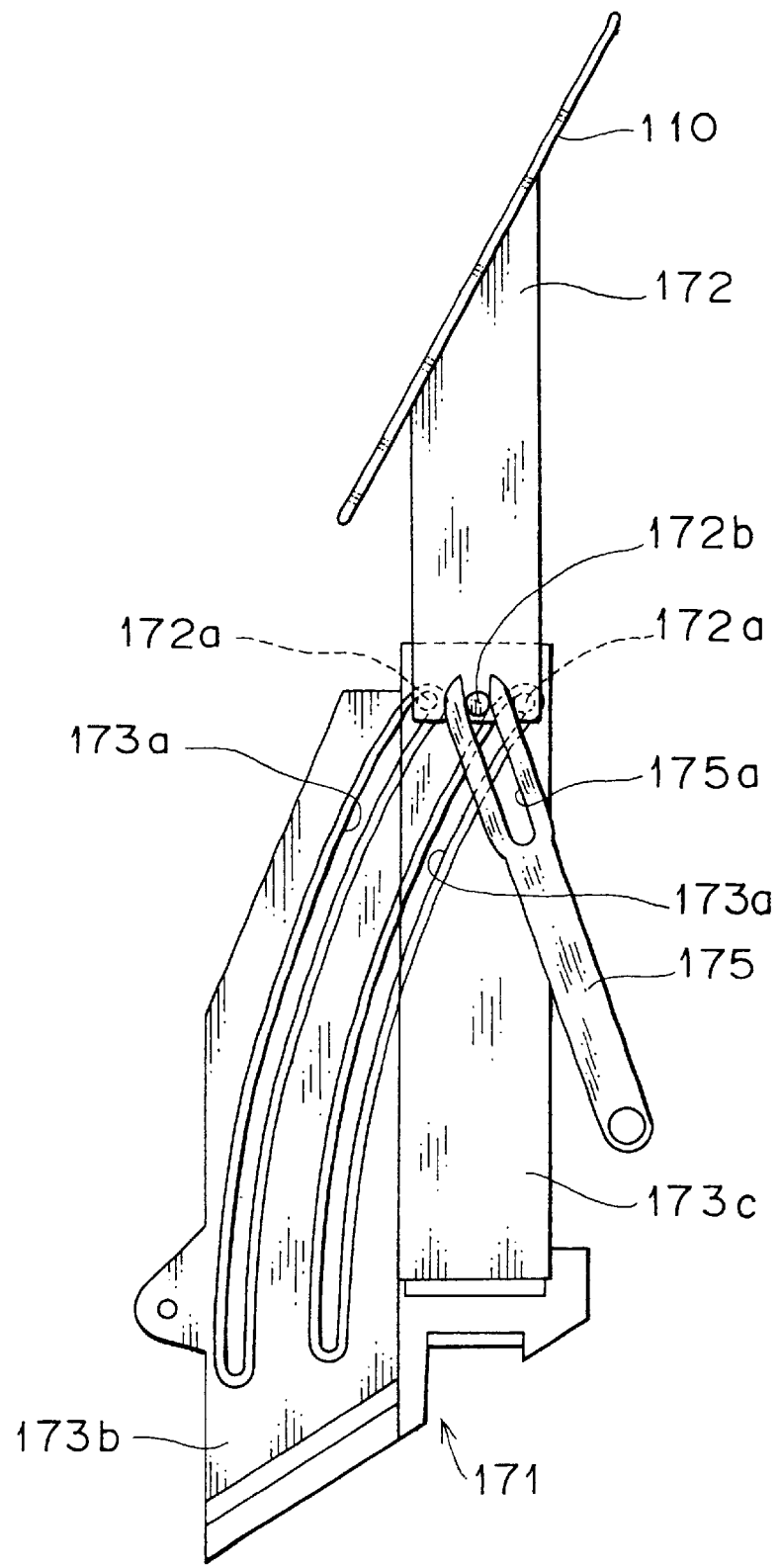
FIG. 11 is a side view showing another operation state of the link unit of FIG. 9.

The pair of guide pins 172a of the supporting strut 172 move from the lower ends to the upper ends of the guide cam slots 173a which are formed across the fixed base frame 173b and the movable base frame 173c, so that the combining screen 110 joined to the supporting strut 172 moves from a stored position shown in FIGS. 9 and 10 to an intermediate position shown in FIG. 11 within the dashboard 1. At the stored position, the combining screen 110 is located in front of the case 160 in a forward direction of the vehicle, while at the intermediate position, the combining screen 110 is positioned above the case 160.

The movement of the supporting strut 172 together with the combining screen 110 between the stored position and the intermediate position is carried out by a swing arm 175. The swing arm 175 has an elongated slot 175a formed at a fore end thereof for slidably receiving the link pin 172b of the supporting strut 172, and the swing arm 175 is swung by a motor (not shown) between the states shown in FIGS. 10 and 11. At the intermediate position of the combining screen 110, the link pin 172b of the supporting strut 172 is positioned around an open end of the elongated slot 175a of the swing arm 175 as illustrated in FIG. 11.

Since each guide cam slot 173a defines an arc shape, the movement of the guide pins 172a along the guide cam slots 173a varies the inclination angle of the combining screen 110 during the shift of the combining screen 110 between the stored position and the intermediate position. The inclination of the combining screen 110 orients generally in a vertical direction of the vehicle at the stored position, while the inclination of the combining screen 110 is generally parallel to the windshield 3 at the intermediate position.

Figure 12:
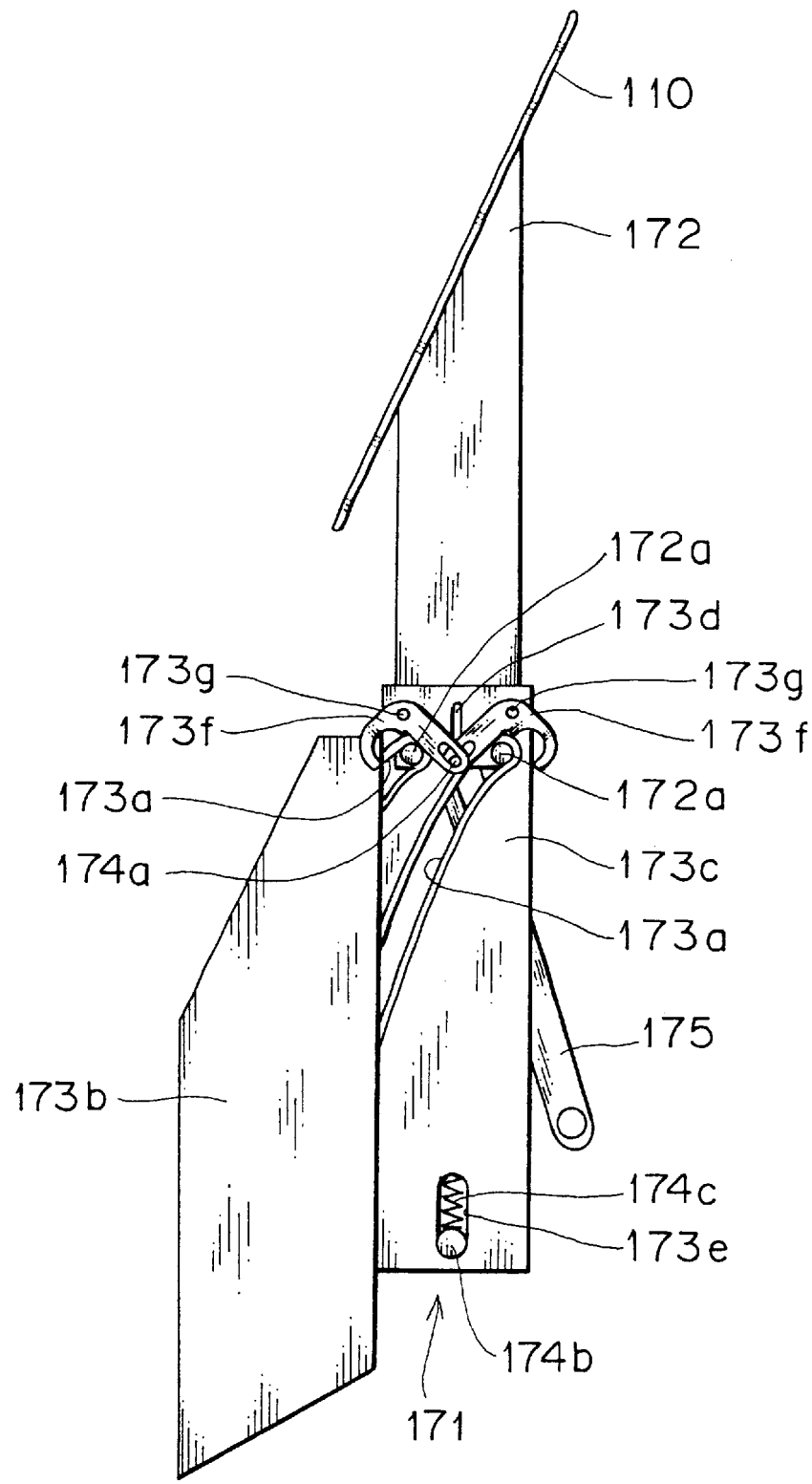
FIG. 12 is a side view showing further another operation state of the link unit of FIG. 9.

As illustrated in FIG. 12 showing an outer side view of the link unit, there are provided vertically elongated holes 173d and 173e each formed at an upper or lower end portion of the movable base frame 173c to penetrate the movable base frame 173c. Furthermore, a pair of locking levers 173f are provided on an outer surface of the movable base frame 173c at an upper end portion of the movable base frame 173c near the top ends of the guide cam slots 173a.

Figure 13:
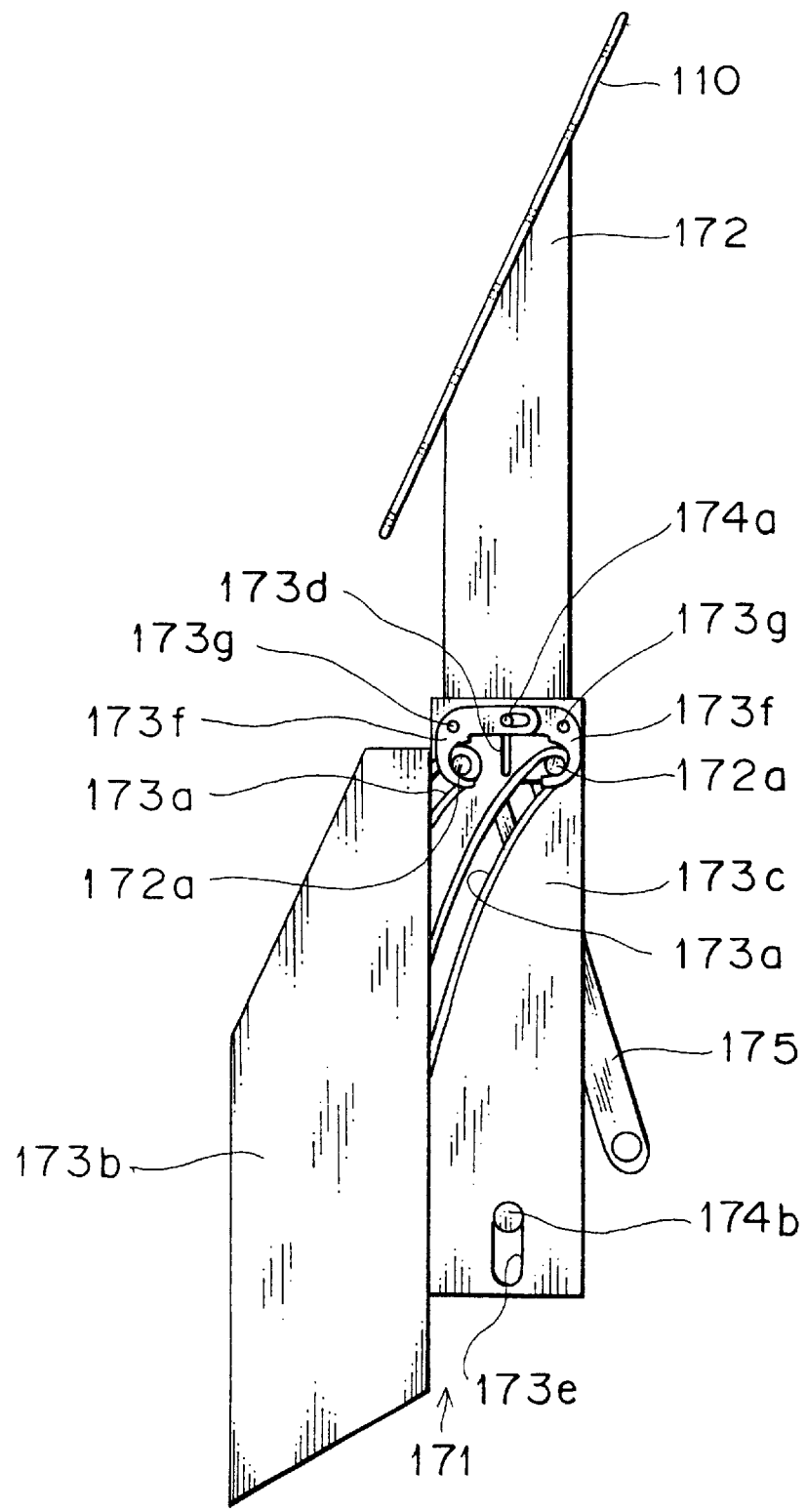
FIG. 13 is a side view showing further another operation state of the link unit of FIG. 9.

Each locking lever 173f swings around a fulcrum 173g to hold each guide pin 172a which has been located at the top of each guide cam slot 173a as illustrate in FIG. 13, when a connection pin 174a formed on the supporting strut 172 moves upward within the elongated hole 174d. In the meantime, the locking lever 173f swings around the fulcrum 173g to release the guide pin 172a as illustrate in FIG. 12, when the connection pin 174a moves downward within the elongated hole 174d.

Figure 14:
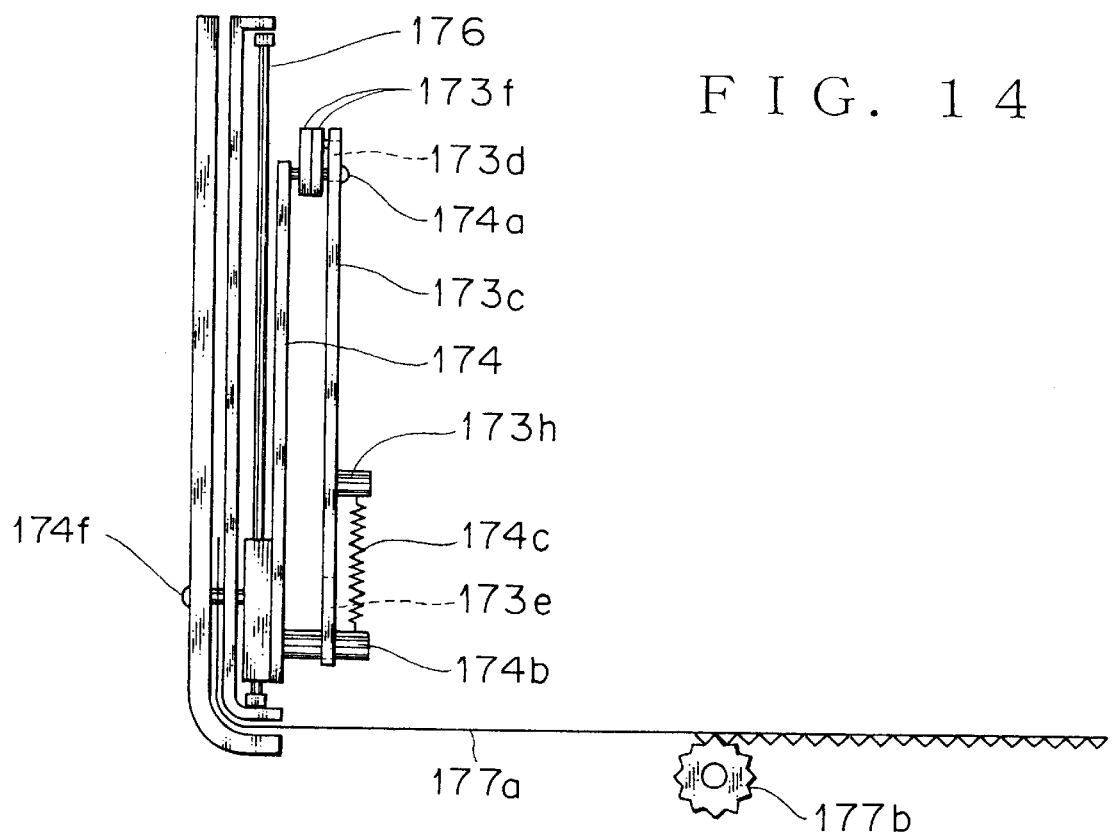
FIG. 14 is a rear view showing an operation state of the link unit of FIG. 9.

As illustrated in FIG. 14, an elevating frame 174 is provided in an outer side of the movable base frame 173c parallel to the movable base frame 173c. The elevating frame 174 has the connection pin 174a on an inner surface around an upper end of the elevating frame 174, and the connection pin 174a penetrates through the pair of locking levers 173f to be received in the elongated hole 174d of the movable base frame 173c.

The elevating frame 174 further has a spring-biased, inwardly projected spring securing pin 174b received in the elongated hole 173e located at a lower side of the movable base frame 173c. The spring securing pin 174b is connected to one end of a tension spring 174c, and the other end of the tension spring 174c is connected to another spring securing pin 173h projected from an inner surface of the movable base frame 173c a little above the elongated hole 173e. The tension spring 174c acts to bring the spring securing pins 173h, 174b close to each other.

The elevating frame 174 is slidably supported by a guide frame 176 positioned outside the elevating frame 174. Thus, the elevating frame 174 moves upward along the guide frame 176, so that the connection pin 174a moves from the bottom to the top of the elongated hole 173d while the spring securing pin 174b moves upward within the elongated hole 173e. During the movements, only the elevating frame 174 moves upward relative to the movable base frame 173c.

Figure 15:
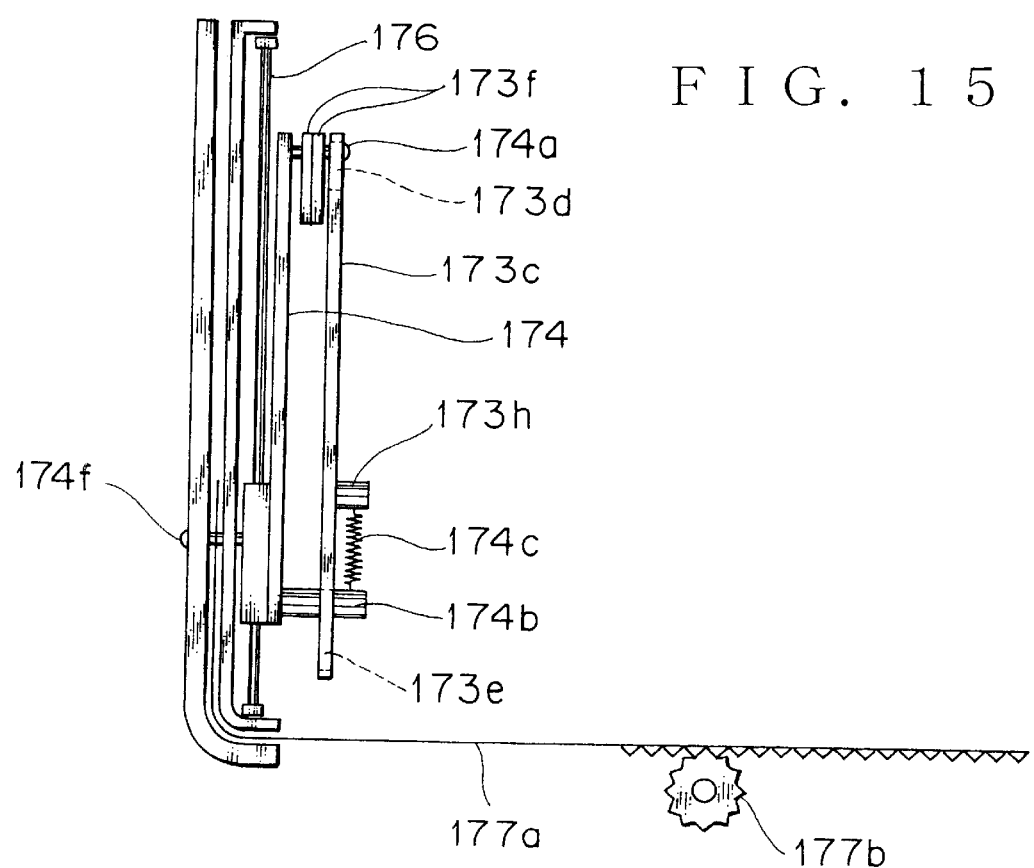
FIG. 15 is a rear view showing further another operation state of the link unit of FIG. 9.

After the connection pin 174a has reached the top of the elongated hole 174d and the spring securing pin 174b also has reached the upper end of the elongated hole 173e as illustrated in the side view of FIG. 15, the movable base frame 173c moves together with the elevating frame 174 via the connection pin 174a and the spring securing pin 174b.

The movement of the connection pin 174a from the bottom to the top of the elongated hole 173d swings each locking lever 173f from the state shown in FIG. 12 around each fulcrum 173g, so that the locking levers 173f hold the guide pins 172a positioned at top ends of the guide cam slots 173a as illustrated in FIG. 13.

Figure 16:
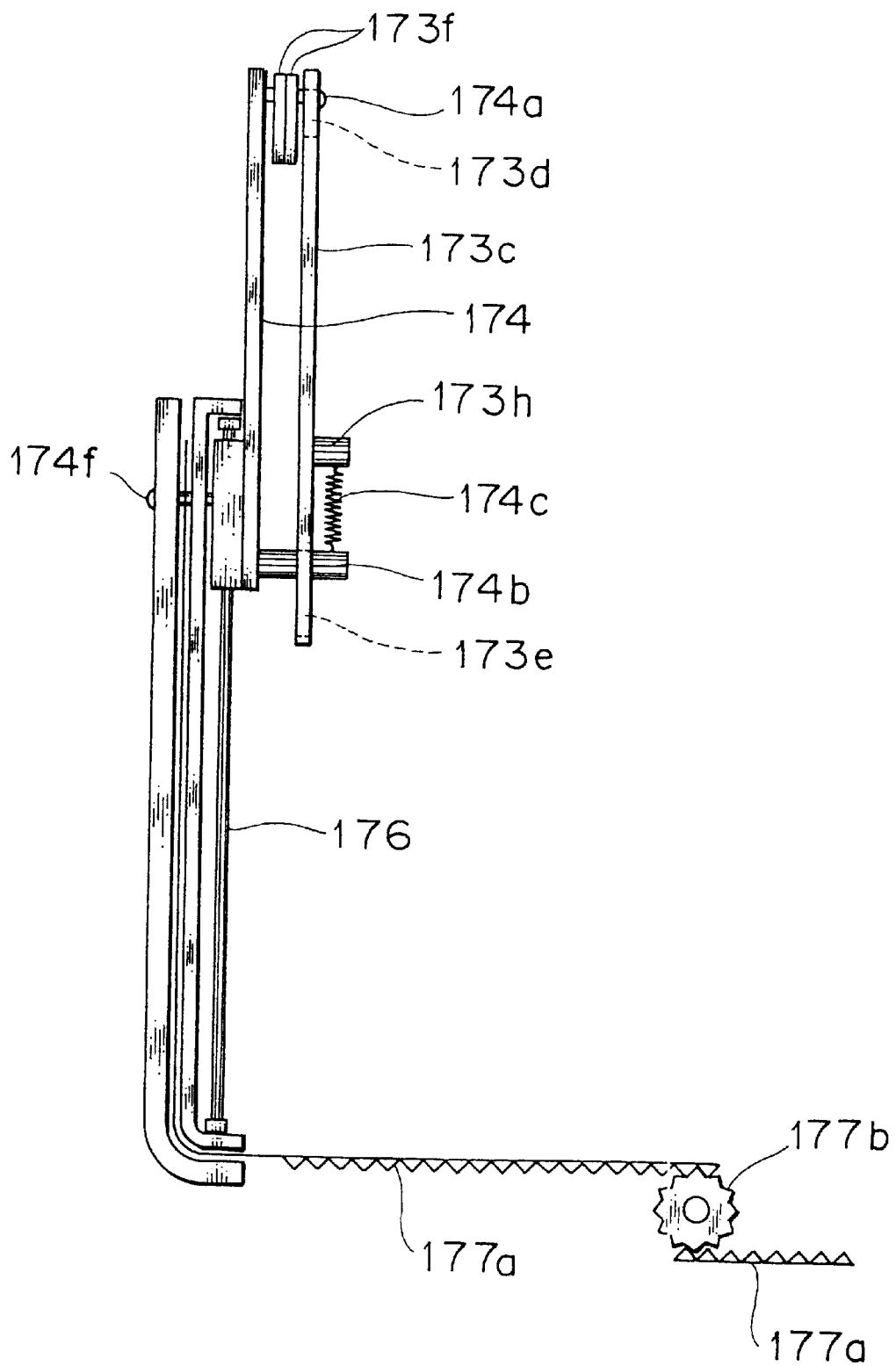
FIG. 16 is a rear view showing further another operation state of the link unit of FIG. 9.

As illustrated in the side view of FIG. 16, a further upward movement of the elevating frame 174 moves the movable base frame 173c together with the combining screen 110 joined to the supporting strut 172, since the guide pins 172a of the supporting strut 172 have been engaged with the locking levers 173f of the movable base frame 173c. Finally, the elevating frame 174 reaches the highest position along the guide frame 176 as illustrated in the perspective view of FIG. 17.

Accordingly, the combining screen 110 is moved outside the dashboard 1 to reach the operational position shown in FIG. 8 where the combining screen 110 is located between the windshield 3 and the driver's eye.

At the intermediate position of the combining screen 110 which is shown in FIG. 11, the pair of locking levers 173f have released the pair of locking levers 173f as illustrated in FIG. 12. The locking levers 173f hold the guide pins 172a when the supporting strut 172 moves upward a little together with the combining screen 110 from the intermediate position as illustrated in FIG. 13.

The elevating frame 174 is moved upward and downward by a motor (not shown) through a timing belt 177a between the intermediate position shown in FIG. 11 and the operational position shown in FIG. 8 or 16. The timing belt 177a has one end connected to a connection pin 174f projected from an outer surface of the elevating frame 174 as illustrated in FIGS. 14 to 16. The timing belt 177a has a proper elasticity that can transmit a driving force of the motor via a pulley 177b. The motor driving force can also move another elevating frame 174 of another link unit 171 via another pulley 177b and another timing belt 177a. The motor is different from the previously mentioned one that can move the swing arm 175.

The reverse rotation of the latter motor moves the timing belt 177a via the pulley 177b so that the elevating frame 174 is moved downward from its highest position along the guide frame 176. Thereby, the combining screen 110 is moved together with the supporting strut 172 downward from the operational position to the intermediate position. During the downward movement, the tension spring 174c urges the spring securing pins 173h, 174b to come close to each another. Thus, the movable base frame 173c moves downward together with the elevating frame 174.

That is, the locking levers 173f have been holding the guide pins 172a until the elevating frame 174 reaches its lowest position along the guide frame 176 as illustrated in FIG. 12. Because, the connection pin 174a has not reached the lower end of the elongated hole 173d before the combining screen 110 reaches the intermediate position.

As illustrated in a partially sectional, side view of FIG. 18, the cover unit 190 has fore and rear covers 191, 192 for closing the opening 1b, a link arm 193 for operatively connecting the rear cover 192 to the swing arm 175, a coil spring 194 urging the fore cover 191 toward its open position, a swing limiting arm 195 for pivotably connecting the fore cover 191 to a frame 1c of the opening 1b, etc.

The rear cover 192 is made of an opaque material as well as the dashboard 1 and is defined in a generally rectangular plate having frames. The rear cover 192 has a rear end pivotably supported by a peripheral surface of the upper surface 1a of the dashboard 1 at a rear side of the opening 1b in a longitudinal direction of the vehicle.

The rear cover 192 has a fore end which is pivotably connected to one end of the link arm 193 via a bracket 192a, and the other end of the link arm 193 is pivotably connected to a middle portion of the swing arm 175. The rear cover 192 further has a bracket 192c positioned at a fore side of the bracket 192a, and the bracket 192c is fitted with a pushing tag 192b at a fore end portion thereof.

The rear cover 192 stands up relative to the upper surface 1a of the dashboard 1 as illustrated in FIG. 19, when the swing arm 175 has been swung to reach the intermediate position shown in FIG. 11. That is, the rear cover 192 opens a main rear part of the opening 1b while the standing rear cover 192 interrupts the view line S oriented from the driver's eye I toward the inside of the dashboard 1 through the opening 1b.

The rear cover 192 is laid along the upper surface 1a of the dashboard 1 as illustrated in FIG. 18, when the swing arm 175 has been swung to-reach the stored position shown in FIG. 10. That is, the rear cover 192 closes the main rear part of the opening 1b so that the view line S oriented from the driver's eye I toward the dashboard 1 can not enter the inside of the dashboard 1 through the opening 1b.

The rear cover 192 has a rear face with a satin finish to prevent the reflection of light from the rear face which orients toward the opening 1b in the open state of the cover unit.

Like the rear cover 192, the fore cover 191 is made of an opaque material as well as the dashboard 1 and is defined in a generally rectangular plate having frames. The fore cover 191 has a forward end which is pivotably connected to a fore side peripheral portion of the opening 1b of the dashboard upper surface 1a. The fore cover 191 is urged toward its open position to open a fore smaller part of the opening 1b by the coil spring 194 fitted around a pivot shaft of the fore cover 191.

The fore cover 191 has a rear end formed with an elongated hole 191a which receives a connection pin 195a fitted on one end of the swing limiting arm 195. Thus, the fore cover 191 is pivotably connected to the swing limiting arm 195. The other end of the swing limiting arm 195 is pivotably supported by a rear peripheral portion of the opening 1b.

The rear cover 192 closes the rear larger part of the opening 1b as illustrated in FIG. 18, when the swing arm 175 has been swung to have an angle corresponding to the stored position shown in FIG. 10 of the combining screen 110. In the closed state, the pushing tag 192b of the rear cover 192 is pushing the swing limiting arm 195 toward the inside of the dashboard 1 against the urging opening force of the coil spring 194. The swing limiting arm 195 stops a further swing of the rear cover 192 in the closed state where the rear cover 192 is laid along the upper surface 1a of the dashboard 1.

The fore cover 191 opens the fore smaller part of the opening 1b as illustrated in FIG. 19, when the swing arm 175 has been swung to have an angle corresponding to the intermediate position shown in FIG. 11 of the combining screen 110. The pushing tag 192b of the rear cover 192 releases the swing limiting arm 195 so that the swing limiting arm 195 swings around the other end thereof by the urging opening force of the coil spring 194. The swing limiting arm 195 stops a further swing of the fore cover 191 in the open state where the fore cover 191 is standing up relative to the upper surface 1a of the dashboard 1.

Thus, the opening and closing movements of the fore covers 191, 192 are attained by the swing of the swing arm 175 moved between the stored position and the intermediate position of the combining screen 110. The combining screen 110 is in no interference relationship with the covers 191, 192 as illustrated in FIGS. 13 and 14, since the combining screen 110 moves in relation to the swing of swing arm 175 as well as the covers 191, 192.

An upper surface of each of the covers 191, 192 has a curvature in conformity with the upper surface 1a of the dashboard 1 in the closed state thereof.

Note that the rear cover 192 of the head-up display 100 of the second embodiment serves also as the intercepting plate described in the summary of the invention.

Next, an operation of thus configured head-up display 100 of the second embodiment, particularly of the cover unit 190, will be discussed.

For superposing an enlarged virtual image of optical information emitted from the displaying device 130 on a foreground seen through the windshield 3 and the combining screen 110 to be visible from the driver's eye, first, the motor for moving the swing arm 175 is rotated by a predetermined number of turns. The driving force of the motor swings the swing arm 175 from one state shown in FIG. 10 corresponding to the stored position to another state shown FIG. 11 corresponding to the intermediate position of the combining screen 110.

Thereby, the rear cover 192 pivotably connected to the swing arm 175 via the link arm 193 moves to its open position, while the pushing tag 192b of the rear cover 192 releases the swing limiting arm 195 so that the fore cover 191 is opened by the urging force of the coil spring 194. Thus, the fore and rear covers 191, 192 completely open the opening 1b.

In this state, the driver can not see the inside of the dashboard 1, since the view line S to orient from the eye I toward the inside of the dashboard 1 through the upper surface opening 1b is interrupted by the rear cover 192 which has been in its open state.

Next, the second motor for driving the pulley 177b is rotated by a predetermined number of turns. The driving force of the second motor is delivered to the elevating frame 174 via the timing belt 177a so that the elevating frame 174 moves upward from its lowest position. At the same time, the combining screen 110 together with supporting strut 172 moves upward from the intermediate position shown in FIG. 11 to the operational position shown in FIG. 8 or 16.

Accordingly, an image emitted from the displaying device 130 is reflected by the magnifying reflector 150 to pass through the upper opening 161 of the case 160 and the opening 1b, and the enlarged image is projected on the combining screen 110 which is at the operational position. The enlarged image on the combining screen 110 is superposed on a foreground visible through the combining screen 110 and the windshield 3, when the view line of the driver orients toward the combining screen 110 from the eye I.

Even when an external beam like a sun beam enters the inside of the vehicle through the windshield 3 so that the external beam reaches the rear face of the opened rear cover 192, the external beam is irregularly reflected on the rear face of a satin finish to provide a surface roughness. Thus, the external beam will be little reflected on the rear face of the opened rear cover 192 not to reach the eye I via a further reflection by the windshield 3.

When an enlarged virtual image of optical information emitted from the displaying device 130 is not desired to be superposed on a foreground seen through the windshield 3, the motor for moving the pulley 177b is rotated by a predetermined number of turns opposite to the above-mentioned direction. The driving force of the motor is delivered to the elevating frame 174 via the timing belt 177a so that the elevating frame 174 moves downward from its highest position along the guide frame 176. Thus, the combining screen 110 joined to the supporting strut 172 moves downward from the state shown in FIG. 8 or 16 corresponding to the operational position to another state shown FIG. 11 corresponding to the intermediate position.

Next, the first motor for moving the swing arm 175 is rotated by a predetermined number of turns opposite in direction to the opening operation of the cover unit. The driving force of the first motor swings the swing arm 175 from the state shown in FIG. 11 corresponding to the intermediate position to the state shown FIG. 10 corresponding to the stored position of the combining screen 110.

Thereby, the rear cover 192 pivotably connected to the swing arm 175 via the link arm 193 moves to its closure position, while the pushing tag 192b of the rear cover 192 limits the swing of the swing limiting arm 195 so that the fore cover 191 is closed against the urging force of the coil spring 194. Thus, the covers 191, 192 completely close the opening 1b.

Accordingly, the closed rear cover 192 does not interrupt a view line S originated from the eye I around the opening 1b, allowing a wider view for the eye I.

In the closed state of the fore and rear covers 191, 192, even when an external beam enters the inside of the vehicle through the windshield 3 so that the external beam reaches the covers 191, 192, the external beam is irregularly reflected on the upper surfaces each having a surface roughness of the covers 191, 192. Thus, the external beam will be little reflected on the upper surfaces of the covers 191, 192 not to reach the eye I even via a further reflection by the windshield 3.

The head-up display 100 of the second embodiment of the present invention superposes a virtual image of optical information emitted from the displaying device 130 on a foreground seen through the windshield 3 of the vehicle so as to be visible from a driver's eye I. The displaying device is disposed in the dashboard, and the combining screen 110 is positioned between the windshield 3 and the eye I at the operational condition of the combining screen 110. The combining screen 110 is moved within the dashboard 1 from the stored position located in a fore side of the case 160 accommodating the displaying device 130 to the intermediate position located above the case 160. That is, each of the guide pins 172a of the supporting strut 172 moves from the bottom end to the top end of each arc-shaped guide cam slot 173a, while the swing arm 175 swings to move the supporting strut 172. The guide cam slot 173a is defined across the fixed base frame 173b and the movable base frame 173c. Then, the elevating frame 174 is moved upward with the locking levers 173f of the movable base frame 173c holding the guide pins 172a each positioned at the top of each guide cam slot 173a. Thereby, the movable base frame 173c moves the supporting strut 172 joined to the combining screen 110 from the intermediate position to the operational position.

Thus, the combining screen 110 is received not above the case 160 accommodating the displaying device 130 but in a fore side of the case 160 within the dashboard 1 when the combining screen 110 is not used. Because, it is easier to increase the longitudinal distance than the height of the dashboard 1 to provide an accommodation space for the combining screen 110 around the case 160.

In the second embodiment, the combining screen 110 is moved between the stored position and the intermediate position within the dashboard 1 by the cam mechanism having the guide cam slots 173a and the guide pins 172a, while the combining screen 110 is moved between the intermediate position and the operational position via the pin holding mechanism having the locking levers 173f. However, the cam mechanism can be modified to be integrated with the pin holding mechanism.

The head-up display 100 of the second embodiment of the present invention employs the tension spring 174c to urge the spring securing pin 173h of the movable base frame 173c and the spring securing pin 174b of the elevating frame 174 to move them toward each other. The urging force allows the locking levers 173f to hold the guide pins 172a positioned at the top portions of the guide cam slots 173a even during the downward movement of the elevating frame 174.

In the head-up display 100 of the second embodiment, the combining screen 110 is located in a fore side of the case 160 accommodating the displaying device 130 when received in the stored position, while each link unit 171 of the elevating unit 170 is located in each lateral side of the case 160. Thus, the combining screen 110 is in no interference relationship with the link unit 171 when moved between the stored position and the intermediate position. This configuration minimizes an additional accommodation space for the head-up display 100 in the dashboard 1.

In the head-up display 100 of the second embodiment, the inclination angle of the combining screen 110 varies between the stored position and the intermediate position. Thus, the combining screen 110 is located close to the case 160 at the stored position to minimize the accommodation space of the combining screen 110, while the combining screen 110 has a desired inclination angle generally parallel to the windshield 3 at the operational position.

The cover unit 190 may be configured to move independently of the movement of the combining screen 110. It may be an optional construction that the rear cover 192 of the cover unit 190 serves to interrupt a view line originated from the eye I to prevent the view line from entering the inside of the dashboard 1 through the opening 1b.

However, it is advantageous that the rear cover 192 serves to interrupt the view line S originated from the eye I to prevent the view line S from entering the inside of the dashboard 1 through the opening 1b to eliminate an annoyance for the driver's operation.

In the head-up display 100 of the second embodiment, the fore and rear covers 191, 192 define a part of the upper surface 1a of the dashboard 1 in the closed state thereof and have the upper surfaces each treated to have a surface roughness to prevent light reflection as well as the dashboard upper surface 1a. The surface treatment of the covers 191, 192 may be a satin finish to provide a surface roughness.

In the head-up display 100 of the second embodiment, the swing arm 175 is moved by the driving force of the first motor in relation to the movement of the combining screen 110 between the stored position and the intermediate position.

However, the movement of the swing arm 175 may be started in response to the ON operation of the displaying device 130 so that the combining screen 110 moves from the stored position to the intermediate position and in response to the OFF operation of the displaying device so that the combining screen 110 moves from the intermediate position to the stored position.

What is claimed is:

1. A cover unit for a head-up display disposed in a vehicle to open and close an opening which passes beams of an image emitted from a displaying device toward a screen, the displaying device disposed in a dashboard, the image being superposed on a foreground of the vehicle so as to be visible from a driver's eye, the screen located outside the dashboard, the cover unit comprising:

an intercepting plate movable between a standing position and a lying position, the intercepting plate standing on a rear periphery of the opening for interrupting a view line directed from the eye toward the inside of the dashboard at the standing position, the intercepting plate not interrupting a view line directed from the eye toward the foreground at the lying position, and a cover body movable to close and open the opening between a closed state and an open state of the opening, wherein the intercepting plate is standing in the open state and is lying in the closed state of the opening.

2. The cover unit as claimed in claim 1 wherein each of the intercepting plate and the cover body has a surface treated to limit reflection of an external beam when the surface faces a side of the opening in the open state of the opening.

3. The cover unit as claimed in claim 1 wherein the cover body has at least one closure member that serves as the intercepting plate.

4. The cover unit as claimed in claim 1 further comprising a transparent protection cover laid over the opening, the transparent protection cover being overlaid by the cover body in the closed state of the opening, wherein the intercepting plate is configured to interrupt an external beam reflected on the transparent protection cover exposed outward at the standing position of the intercepting plate at least to prevent the external beam from entering the eye.

5. The cover unit as claimed in claim 1 wherein the cover body is hinged to the intercepting plate, the cover body being folded up with the intercepting plate in the open state, the cover body being extended together with the intercepting plate in the closed state, and the cover body has an upper surface treated to prevent reflection of an external beam in the open state as well as in the closed state, the upper surface facing generally in a forward direction of the vehicle in the open state.

6. The cover unit as claimed in claim 5 wherein the upper surface of the cover body has an imprint to provide a surface roughness as well as a surface of the dashboard which is flush with the upper surface of the cover body in the closed state.

7. The cover unit as claimed in claim 5 wherein the screen is a combining screen disposed outside the dashboard at an operational position of the combining screen, the combining screen being received in the dashboard at a non-operational position of the combining screen, and the opening and closing movements of the intercepting plate and the cover body are in an interlocking relationship with the movement of the combining screen between the operational position and the non-operational position.

8. The cover unit as claimed in claim 1 wherein the opening and closing movements of the intercepting plate and the cover body are in an interlocking relationship with an ON-OFF operation for displaying the image from the displaying device.

9. A cover unit for a head-up display disposed in a vehicle to open and close an opening which passes beams of an image emitted from a displaying device toward a screen, the displaying device disposed in a dashboard, the image being superposed on a foreground of the vehicle to be visible from a driver's eye, the screen located outside the dashboard, the cover unit comprising a fore cover and a rear cover for cooperatively closing the opening, wherein the rear cover interrupts a view line directed from the eye toward the inside of the dashboard at an open position of the rear cover where the rear cover is standing on a rear periphery of the opening.

10. The cover unit as claimed in claim 9 wherein the screen is a combining screen disposed outside the dashboard at an operational position of the combining screen, the combining screen being received in the dashboard through the opening at a non-operational position of the combining screen, and the rear cover is operatively connected to a strut of the combining screen via a swing lever and a link arm so that the opening and closing movements of the cover plates are in an interlocking relationship with the movement of the combining screen between the operational position and the non-operational position.

11. The cover unit as claimed in claim 9 wherein the fore cover is urged toward the open state by a spring.

12. The cover unit as claimed in claim 11 further comprising a swing limiting arm operatively connected to the fore cover for limiting the fore cover in movable range, and the rear cover pushes the swing limiting arm when the rear cover moves to close the opening so that the swing limiting arm can move the fore cover to close the opening together with the rear cover.

13. The cover unit as claimed in claim 9 wherein each of the fore and rear cover plates has an upper surface which is flush with an outer surface of the dashboard in the closed state of the opening.

14. The cover unit as claimed in claim 9 wherein each of the fore and rear cover plates has an upper surface in the closed state of the opening, and the upper surface has an imprint to provide a surface roughness as well as an outer surface of the dashboard.

15. The cover unit as claimed in claim 9 wherein the rear cover has a rear face with a satin finish to attain irregular reflection of an external beam in the open state of the cover unit.

* * * * *